(12) United States Patent
Cohen

(10) Patent No.: US 6,171,537 B1
(45) Date of Patent: Jan. 9, 2001

(54) PREPARATION OF POLY(URETHANEUREA) FIBERS

(75) Inventor: Jeffrey David Cohen, Kennett Square, PA (US)

(73) Assignee: E.I. du Pont de Nemours and Company, Wilmington, DE (US)

( * ) Notice: Under 35 U.S.C. 154(b), the term of this patent shall be extended for 0 days.

(21) Appl. No.: 09/275,750

(22) Filed: Mar. 25, 1999

Related U.S. Application Data

(63) Continuation-in-part of application No. 09/165,932, filed on Oct. 2, 1998, now abandoned.
(60) Provisional application No. 60/005,494, filed on Oct. 16, 1995, provisional application No. 60/028,354, filed on Oct. 11, 1996, and provisional application No. 60/061,340, filed on Oct. 8, 1997.

(51) Int. Cl.⁷ .............................. B28B 3/20; B29C 47/00; B29C 47/60; B29C 47/78; C08G 18/00
(52) U.S. Cl. ................................. 264/211.22; 264/176.1; 264/178 F; 264/184; 264/205; 264/211.12; 264/211.24; 528/44
(58) Field of Search ........................... 528/44; 264/176.1, 264/184, 178 F, 205, 211.12, 211.22, 211.24

(56) References Cited

U.S. PATENT DOCUMENTS

| | | | |
|---|---|---|---|
| 3,635,908 | 1/1972 | Vogt et al. | 268/77.5 AA |
| 5,302,660 | 4/1994 | Klinksiek et al. | 524/871 |
| 5,583,196 | * 12/1996 | Lehmann et al. | 528/49 |

FOREIGN PATENT DOCUMENTS

| | | | |
|---|---|---|---|
| 0 553 944 | 8/1993 | (EP) | C08G/18/10 |
| 0 579 979 | 1/1994 | (EP) | D01F/6/70 |
| WO 9625539 | 8/1996 | (WO) | D01F/6/70 |

* cited by examiner

*Primary Examiner*—Patrick D. Niland
(74) *Attorney, Agent, or Firm*—George A. Frank

(57) ABSTRACT

A process for the preparation of poly(urethaneurea) fibers by reacting a blocked aliphatic diamine with a capped glycol prepolymer, followed by extrusion spinning, is provided.

3 Claims, No Drawings

PREPARATION OF POLY (URETHANEUREA) FIBERS

CROSS REFERENCE TO RELATED APPLICTIONS

This application is a continuation-in-part of application Ser. No. 09/165,932, filed Oct. 2, 1998 now abandoned which application claims the benefit of U.S. Provisional Application Ser. No. 60/005,494, filed Oct. 16, 1995 and U.S. Provisional Application Ser. No. 60/028,354, filed Oct. 11, 1996 and U.S. Provisional Application Ser. No. 60/061,340, filed Oct. 8, 1997.

FIELD OF THE INVENTION

This invention is related to a reaction extrusion spinning process for the preparation of poly(urethaneurea) fibers.

BACKGROUND OF THE INVENTION

Poly(urethaneurea) polymers have many uses. For example, such polymers are used to make the fiber known as spandex. As used herein, "spandex" has its customary meaning, that is, a manufactured fiber in which the fiber-forming substance is a long chain synthetic polymer comprised of at least 85% by weight of a segmented polyurethane.

Poly(urethane-urea) polymers are typically made by forming a prepolymer from a polymeric diol and a diisocyanate, and then reacting this prepolymer ("capped glycol") with a diamine in a solvent. Finally, the polymer solution is forced through a spinneret into a column in which the solvent is evaporated from the solution, forming the fiber.

The reaction of the capped glycol with the diamine is often carried out in solution, and the desired fiber is spun from that solution. From an economic standpoint it would be desirable to be able to prepare poly(urethaneureas) in the substantial absence of solvent and, furthermore, to be able either to spin directly into spandex, or to isolate such polymers for later spinning.

The use of blocked diamines for making poly (urethaneurea), from which spandex is made, is described in U.S. Pat. No. 5,302,660, showing the preparation of the poly(urethaneureas) in the presence of solvents.

U.S. Pat. No. 3,635,908 discloses the use of polyamine carbamates in preparing polyurethaneurea thermoplastic products and the extrusion of films using, for example, screw-type extruders. The pclyurethaneureas are based on an extensive list of polymeric polyols, polyamine carbamates and polyisocyanates.

There remains a need for a method of obtaining poly (urethaneurea) of specific compositions which can be extrusion spun into spandex fibers.

SUMMARY OF THE INVENTION

This invention concerns a process for the manufacture of a poly(urethaneurea) fiber which comprises the steps of:
(a) contacting a diisocyanate with a polyether diol in a molar ratio of approximately 1.2–2.0:1 to form a capped glycol;
(b) contacting the product of step (a) with a blocked aliphatic diamine under shear in the substantial absence of solvent and at a temperature sufficient to cause reaction of said blocked aiphatic diamine with said capped glycol to form poly(urethaneurea), wherein said aliphatic diamine is selected from the group consisting of 2-methyl-1,5-pentenediamine, 1,3-cyclohexanediamine, 1,4-cyclohexanediamine, 1,2-propanediamine, m-xylylenediamine, N-methyl-bis (3-aminopropyl)amine, bis(4-aminocyclohexyl) methane, and an aliphatic diamine having the formula $H_2N(CH_2)_nNH_2$, wherein n is an integer of 2–12; and
(c) extrusion spinning said poly(urethaneurea) at a temperature above that required in step (b) and sufficient thermally to reform the poly(urethaneurea) into a fiber.

DETAILED DESCRIPTION OF THE INVENTION

The process described herein can be carried out using a blocked aliphatic diamine. The term "blocked" herein means that the amine functions are modified so that they do not react (or the reaction is greatly retarded) with the other functionality (isocyanate) when at lower temperatures, such as ambient temperature, but that at higher temperatures, the blocked functionality "unblocks," i.e., becomes reactive with the other functionality. Such blocked amines are well known in the art. See, for instance, Z. W. Wicks, Jr., *Progress in Organic Coatings, vol.* 3, p. 73–99 (1975) and U.S. Pat. No. 3,635,908, Canadian Patent 1,004,821, and Czech Patent 203,548, hereby all incorporated by reference.

The term "aliphatic diamine" herein means a compound that has amino groups directly bound to an aliphatic or cycloaliphatic carbon atom. There can be other nonreactive functional groups or other hydrocarbyl groups (such as an aromatic ring) present in the aliphatic diamine. The amino groups are either primary and/or secondary amino groups. It is preferred, however, that both amino groups are primary. Preferred aliphatic diamines have the formula $H_2N(CH_2)_n NH_2$, wherein n is an integer from 2 to 12, preferably 2 to 6, and more preferably 2. Another preferred aliphatic diamine is bis(4-aminocyclohexyl)-methane. Other conventional diamines include, for example, ethylenediamine, hexamethylenediamine, 1,3-propanediamine, 2-methyl-1,5-pentanediamine, 1,3-cyclohexanediamine, 1,4-cyclohexanediamine, 1,2-propanediamine, m-xylelenediamine, and N-methyl-bis(3-aminopropyl) amine.

An aliphatic diamine can be blocked by a variety of known blocking agents. Preferably, however, the blocked aliphatic diamine is in the form of a carbamate, i.e., the amine "salt" of $CO_2$. Such carbamates are well known in the art.

The term "capped glycol" herein means an isocyanate prepolymer, that is, the reaction product of a polymeric glycol with a diisocyanate. The terms "polymeric glycol" or "polymeric diol" herein mean a polyether, which contains two hydroxyl groups, most commonly end groups, on the polymer. Suitable polyether diols can be homopolymers or copolymers and include those derived from tetramethylene glycol, 2-methyl-1,4-butanediol, tetrahydrofuran, and 3-methyltetrahydrofuran, and copolymers thereof. A preferred polyether diol is polytetramethyleneether diol with a number average molecular weight of 1000 to 5000. Polyurethaneureas made from polyether diols are called polyetherurethaneureas.

The diisocyanate can be an aliphatic or aromatic diisocyanate, such as toluene diisocyanate, bis(4-isocyanatophenyl)methane, isophorone diisocyanate, hexamethylene diisocyanate, and bis(4-isocyanatocyclohexyl) methane. A preferred diisocyanate is bis(4-isocyanatophenyl)methane.

In the reaction to prepare the capped glycol (prepolymer), an excess of diisocyanate over polyether diol is utilized. Preferably the molar ratio of diisocyanate:polymeric diol is about 1.2 to about 2.0, more preferably about 1.5 to about 1.8.

If desired, a monoamine such as diethylamine can be added to control the molecular weight of the final polyurethaneurea.

The temperature at which the process of forming a poly(urethaneurea) is carried out is dependent upon the temperature at which the blocked diamine in the process is unblocked and the resulting diamine reacts with a capped glycol. This temperature can vary according to the particular aliphatic diamine, capped glycol, and blocking agent(s) used, but must not be above the temperature at which any of the starting materials or the poly(urethaneurea) product undergo substantial amounts of unwanted decomposition. Typically, this means a temperature below about 250° C. Unblocking temperatures for various combinations of blocking groups and amines are well known in the art or can be readily determined.

The term "contacting" herein means that the components are physically contacted with one another. At least at the start of the process, they can be separated within one or more discrete phases. For instance, an aliphatic diamine carbamate can be a solid, while an isocyanate prepolymer (capped glycol) can be a liquid. In any case, it is preferred that the mixture of the components be reasonably homogeneous. Any solids present will preferably have a relatively small particle size.

The time necessary to carry out this part of the process can vary with the temperature and will depend on the nature of the particular reactants selected. Such times and temperatures are readily ascertainable to the skilled artisan using routine techniques. Other materials can also be present in the process. For instance, catalysts for the reactions involved, chain stoppers such as (blocked) monoamines which can control the molecular weight of the poly(urethaneurea) formed, antioxidants, and pigments such as $TiO_2$, can also be present.

As indicated above, the process is carried out in the substantial absence of solvent for the starting materials and the polyurethaneurea. The term "solvent" herein means any liquid which can act as a solvent for any one or more of the starting materials or for the product poly(urethaneurea), and which solvent itself is not a reactant or product of the reactions taking place in the process. Small amounts of solvent can be present when needed for convenience. For instance, small amounts of catalyst can be added as a solution. To allow for such small amounts of solvent, the "substantial absence of solvent" shall mean that less than 5% by weight of the total process mixture is solvent. Preferably less than 1% by weight, and more preferably substantially no solvent should be present.

During the time in which unblocking and chain extension take place, the process mixture is suitably subjected to shear. The degree of shear or agitation that is required can depend on a variety of factors, but the minimum amount is that required to produce a poly(urethaneurea) polymer which is soluble in a suitable solvent. If insufficient shear is used in the process of this invention, the properties of the product can be adversely affected. For example, gel formation can occur in the absence of shear and deleteriously affect extrusion spinning.

The shear required can be produced by known means, for example, by a high-shear mixer. Such high shear mixers include the so-called Atlantic mixer, various sigma-blade-type mixers, Buss® kneaders, and the like.

A particularly useful type of mixer is a reactor-extruder, for example, as described by H. Mark et al., Ed., *Encyclopedia of Polymer Science and Engineering*, Vol. 14, John Wiley & Sons, New York, 1988, at p. 169–189. A reactor-extruder not only can provide heating and mixing of the process mixture as required, it can also be used to form the product poly(urethaneurea) into a useful shape or form.

The poly(urethaneurea) that is formed is soluble in a suitable solvent. A suitable solvent is one in which the particular poly(urethaneurea) that is made is soluble, assuming it is not crosslinked, and which solvent does not cause decomposition or reaction of the poly(urethaneurea). The term "soluble" herein means that, upon dissolution of the poly(urethaneurea), substantially no visible gel (i.e., visible to the naked eye) is formed. The solution formed upon dissolution can be filtered and the residue, if any, on the filter visually inspected for gel.

The poly(urethaneureas) produced according to the present invention are particularly useful for preparing spandex fibers. They give fibers with excellent properties, and are relatively easy to form into fibers. Simultaneous with, or just subsequent to the formation of the poly(urethaneurea), the fiber can be extrusion spun from, for example, a reactor-extruder, by heating the polymer to a temperature at which the polymer is reformed. As used herein, extrusion spinning the resulting poly(urethaneurea) means the formation of a fiber.

When using blocked chain-extenders such as ethylenediamine dicarbamate or hexamethylenediamine dicarbamate, the polymer forming step requires a temperature sufficient to melt the diamine carbamate, e.g. 150° C. Due to the intermolecular hydrogen bond strength of the resulting urea groups, the polymer reformation step into fiber requires temperatures higher than the formation step, for example, 190° C. Furthermore, due to the material viscosity relationship with temperature, for practical production rates, fiber formation requires temperatures >190° C. The polymer product is thermally labile and intolerant of sustained high temperatures and thus the duration of the fiber formation step should be kept short.

Considering the need to bring the reactants to a polymerization temperature first, followed by the need to heat the system further for reforming into fiber, a twin-screw extruder was used, operated with a thermal gradient having the highest temperature at the melt die. Insufficient heating in the reforming step can result in excessive pressure at the extruder die thus stalling the equipment. Excessive heating during the reformation step can result in polymer degradation resulting in fibers with poor physical properties, e.g., low break tenacity and unload power.

In the Examples, Type A capped glycol is the reaction product of 1800 number average molecular weight polytetramethyleneether glycol and bis(4-isocyanatophenyl) methane in a ratio of 1.7 moles diisocyanate per mole of polymeric glycol. Type B capped glycol is a like polymer but with a ratio of 1.59 moles diisocyante per mole of polymeric glycol.

EXAMPLE 1

A 183.0-gram quantity of Type B, diisocyanate-capped, polyether glycol was combined in a glass container with 7.39 grams of hexamethylenediamine carbamate (DIAKO® #1), and 1.90 grams of polyvinylpyrrolidone (Aldrich, 10,000 M.W.). The suspension temperature was maintained at 60° C. for a period of 27 minutes with a nitrogen sweep through the vessel head space. A three-bladed impeller, 6.4 cm in diameter, rotating at approximately 300 rpm was used to mix the components. No solvent was used. The viscous suspension was then transferred to the steel cylinder of a large syringe pump. The prepolymer suspension was maintained at room temperature.

The prepolymer suspension was pumped to the inlet of a heated, 5-capacity Zenith® gear pump, modified to allow the prepolymer feed to fall directly onto the pump gears. The inlet of the pump was vented to the atmosphere. The process was a combination of reaction and extrusion spinning of a spandex fiber issued from a single, round-hole spinneret, 0.3 mm diameter by 0.13-mm capillary length, attached to the pump exit.

The gear pump and the spinneret were heated separately. The monofilament spandex fiber was passed through room-temperature air then wound onto a bobbin.

The fiber appeared to be fully reacted and fully consolidated. The arrangement of the feed to the extruder involved communication with the atmosphere and therefore provided an outlet for the evolved carbon dioxide gas countercurrent to the prepolymer and polymer flow. The heated pump initiated the reaction and supplied pressurized, molten polymer to the spinneret.

Fiber attenuation (ratio of melt jet velocity to fiber wind-up velocity) varied fiber denier for a given volumetric/mass flow rate. Fiber spinning conditions are shown in Table 1a. Fiber physical properties are the average of two samples and are given in Table 1b. In the table, TP1, TP2, and TP3 represent tensile stress-positive (i.e., during the elongation portion of cyclic testing) at 100%, 200%, and 300% strain, respectively. The terms TM1, TM2, and TM3 represent tensile stress-minus (during the relaxation portion of cyclic testing) at 100%, 200%, and 300% strain respectively. GPD is grams per denier.

TABLE 1a

| Sample # | Feed Rate ml/min | Pump Temp. ° C. | Spinneret Temp. ° C. |
|---|---|---|---|
| 101A-3 | 1.0 | 227 | 244 |
| 101B-1 | 1.0 | 221 | 245 |
| 101B-3 | 1.0 | 219 | 234 |
| 101B-4 | 1.0 | 220 | 241 |

TABLE 1b

| Sample | Denier | TP1 GPD | TP2 GPD | TP3 GPD | TM3 GPD | TM2 GPD | TM1 GPD |
|---|---|---|---|---|---|---|---|
| 101A-3 | 729 | .048 | .078 | .126 | .086 | .019 | .011 |
| 101B-1 | 1242 | .050 | .078 | .123 | .090 | .021 | .013 |
| 101B-3 | 393 | .043 | .065 | .101 | .070 | .018 | .011 |
| 101B-4 | 464 | .043 | .068 | .107 | .075 | .019 | .010 |

| Sample | Stress Decay % | Tenacity @ Break | Elong. @ Break | % Set |
|---|---|---|---|---|
| 101A-3 | 20.77 | 0.527 | 565.2 | 27.1 |
| 101B-1 | 19.73 | 0.487 | 546.0 | 26.9 |
| 101B-3 | 19.95 | 0.608 | 633.9 | 28.3 |
| 101B-4 | 20.24 | 0.578 | 612.2 | 28.7 |

EXAMPLE 2

A 120.5-gram quantity of Type B, diisocyanate-capped, polyether glycol was combined in a glass container with 4.87 grams of hexamethylenediamine carbamate (DIAK® #1), and 1.25 grams of polyvinylpyrrolidone (Aldrich, 10,000 M.W.). The suspension temperature was maintained at 60° C. for a period of 30 minutes with a nitrogen sweep through the vessel head space. A three-bladed impeller, 6.4 cm in diameter, rotating at about 300 rpm was used to mix the components. No solvent was used. The viscous suspension was then transferred to the steel cylinder of a large syringe pump. The prepolymer suspension was maintained at room temperature.

The prepolymer suspension was pumped to the inlet of a heated, 5-capacity Zenith® gear pump, modified to allow the prepolymer feed to fall directly onto the pump gears. The inlet of the pump was vented to the atmosphere. The process was a combination of reaction and extrusion spinning of spandex issued from a single, round-hole spinneret, 0.41 mm diameter by 0.13-mm capillary length, attached to the pump exit.

The gear pump and the spinneret were heated separately. The monofilament spandex was passed through room temperature air then wound onto a bobbin.

The fiber appeared to be fully reacted and fully consolidated. The arrangement of the feed to the extruder involved communication with the atmosphere and therefore provided an outlet for the evolved carbon dioxide gas countercurrent to the prepolymer and polymer flow. The heated pump initiated the reaction and supplied pressurized, molten polymer to the spinneret.

Fiber attenuation varied fiber denier for a given volumetric/mass flow rate. Fiber spinning conditions appear in Table 2a. Fiber physical properties are the average of two samples and are given in Table 2b.

TABLE 2a

| Sample No. | Feed Rate ml/min | Pump Temp. ° C. | Spinneret Temp. ° C. |
|---|---|---|---|
| 102A-1 | 1.5 | 280 | 245 |

TABLE 2b

| Sample | Denier | TP1 GPD | TP2 GPD | TP3 GPD | TM3 GPD | TM2 GPD | TM1 GPD |
|---|---|---|---|---|---|---|---|
| 102A-1 | 1840 | .048 | .079 | .130 | .101 | .022 | .014 |

| Sample | Stress Decay % | Tenacity @ Break | Elong. @ Break | % Set |
|---|---|---|---|---|
| 102A-1 | 19.56 | 0.579 | 546.9 | 31.2 |

EXAMPLE 3

A 131.1-gram quantity of Type B, diisocyanate-capped, polyether glycol was combined in a glass container with 5.30 grams of hexamethylenediamine carbamate (DIAK® #1), and 0.341 gram of sodium dodecylsulfate. The suspension temperature was maintained at 62–64° C. for 25 minutes with a nitrogen sweep through the vessel head space. A three-bladed impeller, 6.4-cm in diameter, rotating at approximately 300 rpm was used to mix the components. No solvent was 40 used. The viscous suspension was then transferred to the steel cylinder of a large syringe pump. The prepolymer suspension was maintained at room temperature.

The prepolymer suspension was pumped to the inlet of a heated 5-capacity Zenith® gear pump, modified to allow the prepolymer feed to fall directly onto the pump gears. The inlet of the pump was vented to the atmosphere. The process was a combination of reaction and extrusion spinning of spandex issued from a single, round-hole spinneret, 0.15-m diameter by 0.13-mm capillary length, attached to the pump exit.

The gear pump and the spinneret were heated separately. The monofilament spandex was passed through room temperature air, then wound onto a bobbin.

The fiber appeared to be fully reacted and fully consolidated. The arrangement of the feed to the extruder involved communication with the atmosphere and therefore provided an outlet for the evolved carbon dioxide gas countercurrent to the prepolymer and polymer flow. The heated pump initiated the reaction and supplied pressurized, molten polymer to the spinneret.

Fiber attenuation varied fiber denier for a given volumetric/mass flow rate. Fiber spinning conditions appear in Table 3a. Fiber physical properties are the average of three samples and are given in Table 3b.

TABLE 3a

| Sample | Feed Rate ml/min | Pump Temp. °C. | Spinneret Temp. °C. |
|---|---|---|---|
| 103B-3 | 0.65 | 301 | 250 |
| 103B-4 | 0.50 | 300 | 237 |

TABLE 3b

| Sample | Denier | TP1 GPD | TP2 GPD | TP3 GPD | TM3 GPD | TM2 GPD | TM1 GPD |
|---|---|---|---|---|---|---|---|
| 103B-3 | 88.3 | .048 | .103 | .168 | .099 | .018 | .011 |
| 103B-4 | 62.3 | .046 | .091 | .150 | .085 | .016 | .010 |

| Sample | Stress Decay % | Tenacity @ Break | Elong. @ Break | % Set |
|---|---|---|---|---|
| 103B-3 | 22.93 | 0.651 | 645.5 | 27.2 |
| 103B-4 | 22.90 | 0.582 | 667.8 | 26.3 |

EXAMPLE 4

A diisocyanate-capped polyether glycol (Type B, 70.85 g) was combined, in a glass container, with 7.16 g (a stoichiometric equivalent) of hexamethylenediamine carbamate (DIAK® #1), 0.854 g of CYANOX® 1790 antioxidant, 0.854 g of CYANOX® 2777 antioxidant (both sold by Cytec Industries, West Patterson, N.J.), and 1.709 g of sodium dodecylsulfate. The resulting prepolymer suspension was maintained at 65° C. for a period of 45 min. with a nitrogen sweep through the kettle head space. A three-bladed impeller, 6.4 cm in diameter, rotating at ~300 rpm, was used to mix the components. No solvent was used. The viscous suspension was then transferred to the steel cylinder of a large syringe pump. The prepolymer suspension was maintained at room temperature.

The prepolymer suspension was pumped at 1.48 mL/min. to the inlet of a 16 mm diametered twin-screw PRISM® TSE 16TC extruder (available from Welding Engineers, Blue Bell, Pa., Model# PC 16-V2-20:1 L/D). The inlet of the extruder was vented to the atmosphere. The process was a combination of reaction and extrusion spinning of spandex, which issued from a single round-hole spinneret, 0.31 mm diameter by 0.91 mm capillary length.

The extruder barrel was divided into five separately controlled temperature zones followed by a separately heated spinneret. The operating temperatures of the extruder appear in the following Table 4.

TABLE 4

| Location | Temperature (° C.) |
|---|---|
| Inlet | 15* |
| Zone 1 | 125 |
| Zone 2 | 155 |
| Zone 3 | 170–180 |
| Zone 4 | 180–190 |
| Spinneret | 250 |

*Estimated at inlet chilled with tap water.

The monofilament spandex was passed through a room temperature, water-filled quench bath and was subsequently wound onto a bobbin. The filament was fully reacted and fully consolidated. The extruded, continuous monofilament had a denier of ~500 to 1100, depending on the level of fiber attenuation applied during spinning. Fiber attenuation is the ratio of melt jet velocity to fiber windup velocity.

EXAMPLE 5

A diisocyanate-capped polyether glycol (Type B, 155.8 g) was combined, in a glass container, with 6.53 g (a stoichiometric equivalent) of hexamethylene-diamine carbamate (DIAK® #1), 0.812 g of CYANOX® 1790 antioxidant, 0.812 g of CYANOX® 2777 antioxidant, and 1.623 g of sodium dodecylsulfate. The resulting prepolymer suspension temperature was maintained at 65° C. for a period of 45 min. with a nitrogen sweep through the vessel head space. A three-bladed impeller, 6.4 cm in diameter, rotating at approximately 300 rpm, was used to mix the components. No solvent was used. The viscous suspension was then transferred to the steel cylinder of a large syringe pump. The prepolymer suspension was maintained at room temperature.

The prepolymer suspension was pumped at 1.48 mL/min. to the inlet of a 16 mm diametered twin-screw PRISM® TSE 16TC extruder (available from Welding Engineers, Blue Bell, Pa., Model# PC 16-V2-20:1 L/D). The inlet of the extruder was vented to the atmosphere. The process was a combination of reaction and extrusion spinning of spandex, which issued from a single round-hole spinneret, 0.36 mm diameter by 0.13 mm capillary length. The extruder barrel was divided into five separately controlled, temperature zones, followed by a separately heated spinneret. The operating temperatures of the extruder appear in the following Table 5.

TABLE 5

| Location | Temperature (° C.) |
|---|---|
| Inlet | 15* |
| Zone 1 | 110 |
| Zone 2 | 135 |
| Zone 3 | 150 |
| Zone 4 | 170 |
| Spinneret | 234–248 |

*Estimated at inlet chilled with tap water.

The monofilament spandex passed through a room temperature, water-filled quench bath and was subsequently wound onto a bobbin at a winder speed in the range of 11.6 to 29.9 m per min. The fiber was fully reacted and fully consolidated. The extruded continuous monofilament had a denier in the range of 435 to 1093, depending on the level of fiber attenuation applied during spinning.

EXAMPLE 6

A diisocyanate-capped polyether glycol (Type B, 145.8 g) was combined, in a glass container, with 6.08 g (a stoichiometric equivalent) of hexamethylenediamine carbamate (DIAK® #1), 0.756 g of CYANOX® 1790 antioxidant, 0.756 g of CYANOX® 2777 antioxidant, and 1.512 g of sodium dodecylsulfate. The prepolymer suspension was maintained at 65° C. for a period of 40 min. with a nitrogen sweep through the vessel head space. A three-bladed impeller, 6.4 cm in diameter, rotating at approximately 300 rpm, was used to mix the components. No solvent was used. The viscous suspension was then transferred to the steel cylinder of a large syringe pump. The prepolymer suspension was maintained at room temperature.

The prepolymer suspension was pumped at 1.48 mL/min. to the inlet of the extruder of Example 4 except that the spinneret had a single, round hole of 0.36 mm diameter by 0.38-mm capillary length. The operating temperatures of the extruder are shown in the following Table 6a.

TABLE 6a

| Location | Temperature (° C.) |
|---|---|
| Inlet | 15* |
| Zone 1 | 100–125 |
| Zone 2 | 135–155 |
| Zone 3 | 150–170 |
| Zone 4 | 165–180 |
| Spinneret | 235–247 |

*Estimated at inlet chilled with tap water.

The monofilament spandex was passed through a room temperature, water-filled quench bath and was subsequently wound onto a bobbin at a winder speed range of 11.9 to 16.5 m per minute. The fiber was fully reacted and fully consolidated. Denier was adjusted by varying fiber attenuation during spinning. Fiber physical properties are shown in the following Table 6b.

TABLE 6b

| Denier | TP1 GPD | TP2 GPD | TP3 GPD | TM3 GPD | TM2 GPD | TM1 GPD |
|---|---|---|---|---|---|---|
| 990.0 | 0.046 | 0.080 | 0.133 | 0.094 | 0.020 | 0.013 |
| 1100 | 0.042 | 0.069 | 0.111 | 0.080 | 0.019 | 0.012 |
| 911.0 | 0.044 | 0.074 | 0.122 | 0.087 | 0.020 | 0.013 |
| 692.5 | 0.046 | 0.081 | 0.137 | 0.093 | 0.020 | 0.013 |
| 711.0 | 0.045 | 0.077 | 0.127 | 0.086 | 0.019 | 0.012 |

| Stress Decay % | Tenacity @ Break | Elong. @ Break | % Set |
|---|---|---|---|
| 19.3 | 0.744 | 645.5 | 26.8 |
| 18.8 | 0.704 | 679.9 | 27.9 |
| 19.4 | 0.683 | 647.9 | 27.1 |
| 20.3 | 0.665 | 633.6 | 26.0 |
| 20.0 | 0.608 | 656.7 | 28.2 |

EXAMPLE 7

A diisocyanate-capped polyether glycol (Type B, 171.7 g) was combined, in a glass container, with 7.19 g (a stoichiometric equivalent) of hexamethylenediamine carbamater (DIAK® #1), 0.894 g of CYANOX® 1790 antioxidant, 0.894 g of CYANOX® 2777 antioxidant, and 1.789 g of sodium dodecylsulfate. The suspension temperature was maintained at 65° C. for a period of 50 min with a nitrogen sweep through the vessel head space. Twin three-bladed impellers, 6.4 cm in diameter, rotating at approximately 300 rpm, were used to mix the components. No solvent was used. The viscous suspension was then transferred to the steel cylinder of a large syringe pump. The polymer suspension was maintained at room temperature.

The polymer suspension was pumped at 5.44 mL/min to the inlet of the extruder of Example 4 except that the single round-hole spinneret was 0.41 mm in diameter by 0.13-mm capillary length. The operating temperatures are shown in the following Table 7a.

TABLE 7a

| Location | Temperature (° C.) |
|---|---|
| Inlet | 15* |
| Zone 1 | 125 |
| Zone 2 | 155 |
| Zone 3 | 180 |
| Zone 4 | 190 |
| Spinneret | 270 |

*Estimated at inlet chilled with tap water.

The fiber was passed through a room temperature, water-filled quench bath and was subsequently wound onto a bobbin at a winder-speed of 56.4 m per minute. The fiber was fully reacted and fully consolidated. Denier was adjusted by varying fiber attenuation during spinning. Fiber physical properties are shown in the following Table 7b.

TABLE 7b

| Denier | TP1 GPD | TP2 GPD | TP3 GPD | TM3 GPD | TM2 GPD | TM1 GPD |
|---|---|---|---|---|---|---|
| 827.5 | 0.048 | 0.083 | 0.140 | 0.098 | 0.021 | 0.013 |

| Stress Decay % | Tenacity @ Break | Elong. @ Break | % Set |
|---|---|---|---|
| 19.0 | 0.778 | 619.3 | 27.0 |

EXAMPLE 8

A diisocyanate-capped polyether glycol (Type B, 123.8 g) was combined in a glass container with 5.13 g (a stoichiometric excess) of hexamethylenediamine carbamate (DIAK® #1), 0.646 g of CYANOX® 1790 antioxidant, 0.646 g of CYANOX® 2777 antioxidant, and 1.29 g of sodium dodecylsulfate. The suspension temperature was maintained at 65° C. for a period of 50 min with a nitrogen sweep through the vessel head space. Twin three-bladed impellers, 6.4 cm in diameter, rotating at about 300 rpm, were used to mix the components. No solvent was used. The viscous suspension was then transferred to the steel cylinder of a large syringe pump. The prepolymer suspension was maintained at room temperature.

The prepolymer suspension was pumped at 1.48 mL/min. to the inlet of the extruder of Example 4 except that the single round-hole spinneret was 0.36 mm in diameter by 0.13-mm capillary length. The operating temperatures of the extruder are shown in the following Table 8a.

TABLE 8a

| Location | Temperature (° C.) |
|---|---|
| Inlet | 15* |
| Zone 1 | 125 |
| Zone 2 | 155 |

TABLE 8a-continued

| Location | Temperature (° C.) |
|---|---|
| Zone 3 | 150 |
| Zone 4 | 170 |
| Spinneret | 269 |

*Estimated at inlet chilled with tap water.

The spandex was passed through a room temperature, water-filled quench bath and was subsequently wound onto a bobbin at a winder-speed of 45.4–48.8 m/min. The spandex was fully reacted and fully consolidated. Fiber physical properties are shown in Table 8b.

TABLE 8b

| Denier | TP1 GPD | TP2 GPD | TP3 GPD | TM3 GPD | TM2 GPD | TM1 GPD |
|---|---|---|---|---|---|---|
| 474.0 | 0.066 | 0.127 | 0.231 | 0.150 | 0.024 | 0.015 |
| 333.5 | 0.067 | 0.132 | 0.238 | 0.148 | 0.023 | 0.013 |

| Stress Decay % | Tenacity @ Break | Elong. @ Break | % Set |
|---|---|---|---|
| 22.8 | 0.884 | 556.9 | 22.5 |
| 23.4 | 0.728 | 530.5 | 22.7 |

What is claimed is:

1. A reaction extrusion spinning process for the manufacture of a poly(urethaneurea) fiber comprising the steps of:

(a) contacting a diisocyanate with a polyether diol derived from the group consisting of tetramethylene glycol, 2-methyl-1,4-butanediol, tetrahydrofuran, and 3-methyltetrahydrofuran in a molar ratio of approximately 1.2–2.0:1 to form a capped glycol;

(b) contacting the product of step (a) with an aliphatic diamine carbamate under shear in the substantial absence of solvent and at a temperature sufficient to cause reaction of said aliphatic diamine carbamate with said capped glycol to form poly(urethaneurea), wherein said aliphatic diamine is selected from the group consisting of 2-methyl-1,5-pentenediamine, 1,3-cyclohexanediamine, 1,4-cyclohexanediamine, 1,2-propanediamine, m-xylylenediamine, N-methyl-bis(3-aminopropyl)amine, bis(4-aminocyclohexyl)methane, and an aliphatic diamine having the formula $H_2N(CH_2)_nNH_2$, wherein n is an integer of 1–12; and (c) extrusion spinning said poly(urethaneurea) through a spinneret having a diameter of about 0.15–0.41 mm at a temperature above that required in step b and sufficient thermally to reform the poly(urethaneurea) into a fiber having a denier of about 62–1840.

2. The process of claim 1 wherein said diisocyanate is bis(4-isocyanatophenyl)methane.

3. The process of claim 1 wherein the aliphatic diamine carbamate is 1,6-hexamethylenediamine carbamate.

* * * * *